Figure 3:
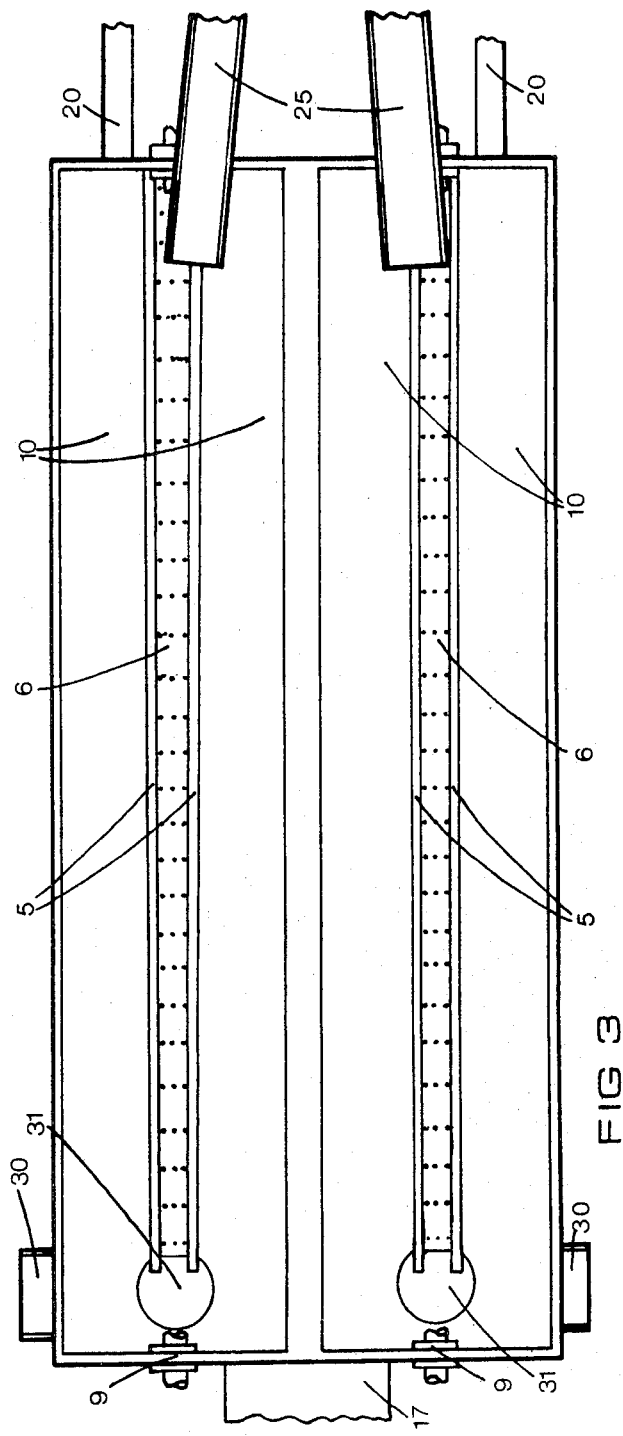

United States Patent [19]

Lustig

[11] 4,450,762
[45] May 29, 1984

[54] ONION PEELING MEANS

[75] Inventor: Thomas P. Lustig, Wellington, New Zealand

[73] Assignee: Development Finance Corp. of New Zealand, Wellington, New Zealand

[21] Appl. No.: 385,011

[22] Filed: Jun. 4, 1982

[51] Int. Cl.³ .............................................. A23N 7/00
[52] U.S. Cl. ....................................... 99/584; 99/483; 99/646 R; 426/482
[58] Field of Search ................. 99/451, 483, 516, 536, 99/584, 585, 623, 635–639, 643, 646 R; 426/482

[56] References Cited

U.S. PATENT DOCUMENTS

| 3,437,116 | 4/1969 | Daugherty | 99/584 |
| 3,942,428 | 3/1976 | Clausen | 99/585 X |
| 4,373,589 | 2/1983 | Hagiz | 99/639 X |

FOREIGN PATENT DOCUMENTS

| 2547863 | 5/1977 | Fed. Rep. of Germany | 99/585 |
| 46-42933 | 12/1971 | Japan | 426/482 |
| 377023 | 1/1931 | United Kingdom | |
| 628768 | 7/1947 | United Kingdom | |
| 1165554 | 6/1968 | United Kingdom | |

Primary Examiner—Timothy F. Simone
Attorney, Agent, or Firm—Joseph W. Farley

[57] ABSTRACT

Apparatus for flame peeling onions comprises a pair of parallel spaced apart rails along which onions are conveyed by a worm conveyor having a central shaft mounted above and parallel to the rails and having a periphery formed by helical teeth positioned in close proximity to the rails. Curved guards extend outwardly and upwardly from the rails adjacent to the worm conveyor periphery and direct onions displaced from the rails back onto them. A plurality of gas burners located directly below the rails are adapted to scorch the skins of onions being conveyed on the rails. Onions are loaded singly onto the rails from a container by a rotatable wheel having peripheral scoops, the wheel being mounted so that the scoops pass through and collect onions from the container and deposit them onto a chute leading to the rails.

10 Claims, 4 Drawing Figures

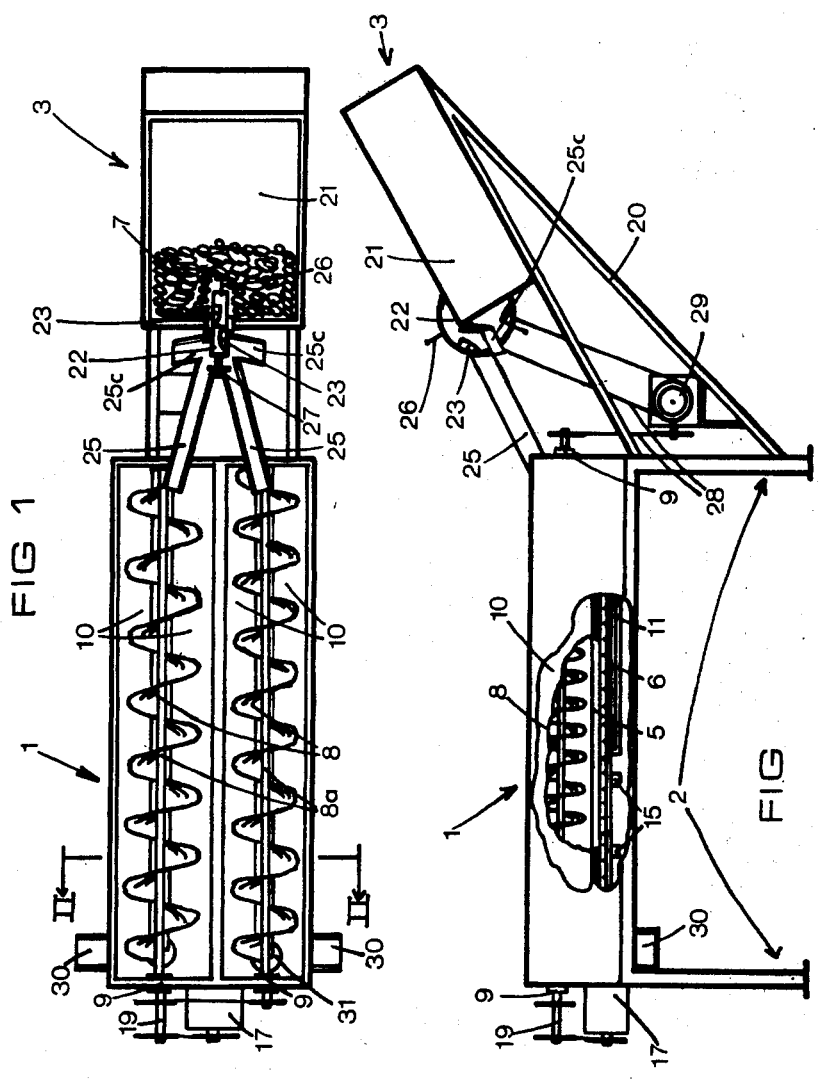

ONION PEELING MEANS

The present invention relates to apparatus for removing the skin and/or unwanted, inedible layers from onions or fruit and root vegetable crops. It is more especially intended for onions but it is envisaged that the apparatus disclosed herein could be used for a number of known fruit or vegetables having an outer layer which it is desired to remove. Accordingly, and for convenience of description, the term "onion" as used herein is intended to include all fruit and/or vegetables from which the skin might be removed using the apparatus of the present invention while the term "skin" is intended to include any inedible or edible matter forming an outer layer or layers on the said fruit or root vegetable crop.

The present invention particularly relates to apparatus for removing the said skin by heating the skin in a flame or other heating means and thereby scorching the skin such that removal may readily be completed by water jets, brushes or the like. Such methods will hereinafter be referred to as flame peeling.

There are known many apparatus for performing flame peeling all of which essentially involve positioning the onions in a flame for a short period so that the skin of the onions is scorched and shrinks. The skin may then be more readily removed than before. Nearly all of the "prior art" apparatus, employ some means to remove the scorched skins, such as water jets, brushes or the like but while it is envisaged that such means can be used in conjunction with the apparatus of the present invention, the present invention is concerned specifically with apparatus for performing the scorching stage only.

Known forms of flame peeling apparatus suffer from a number of disadvantages. They are often of relatively complicated construction and require substantial installation work and are thereby rendered expensive, the capital outlay and maintenance costs of such apparatus often being too high for small institutions.

It is an object of the present invention to provide an alternative construction for an onion peeling machine which will go some way towards overcoming these disadvantages or will at least provide the public with a useful choice.

Accordingly the present invention may be said to comprise apparatus for peeling an onion (as herein defined) by scorching the skin thereof, said apparatus comprising a plurality of spaced apart, substantially parallel rails; a worm conveyor mounted to have its longitudinal axis substantially parallel to and positioned in relation to the rails that rotation of the conveyor will cause an onion resting on the rails to be conveyed along the rails; and heating means to direct heat towards the onion being conveyed along the said rail, said heating means being adjustable to provide heat of a sufficient intensity to scorch the skin of the onion while it is being conveyed substantially the length of the said rails.

Figure 4:
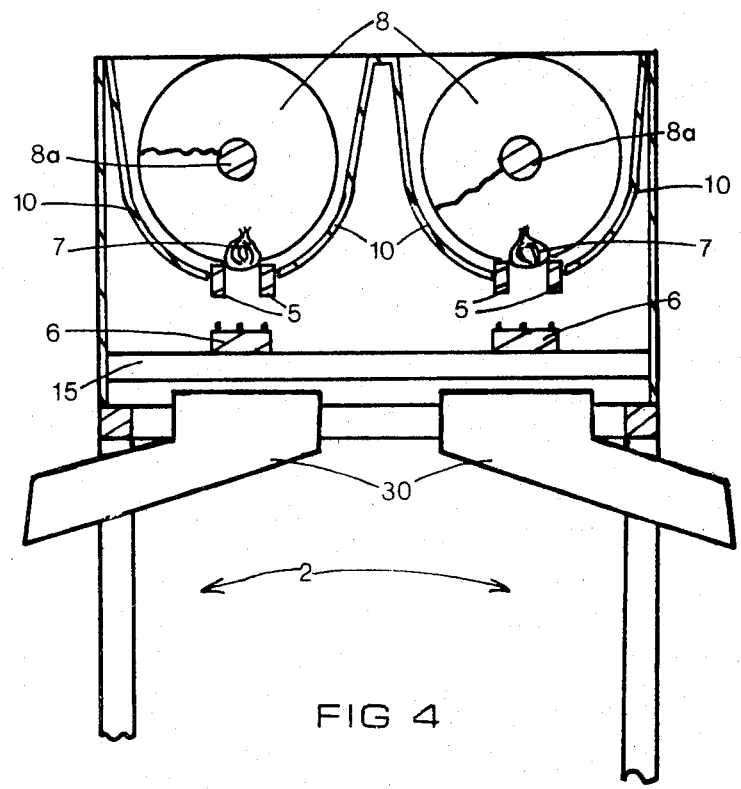

A preferred embodiment of the present invention will now be described with reference to the accompanying drawings wherein:

FIG. 1 shows a schematic plan view of the preferred embodiment onion peeling machine, FIG. 2 shows a schematic partially cutaway side view of the preferred embodiment onion peeling machine, FIG. 3 shows a schematic plan view of the interior of a part of the preferred embodiment onion peeling machine, and FIG. 4 shows a schematic cross-sectional view of the preferred embodiment onion peeling machine along line II—II of FIG. 1.

With reference to the drawings and with particular reference to FIGS. 1 and 2 it can be seen that the preferred embodiment peeling machine essentially comprises a box structure generally indicated at 1, mounted on a support framework generally indicated at 2. An onion loading apparatus generally indicated at 3 is mounted on an end of the support framework 2 to supply onions to flame peeling means situated within the box structure 1.

The construction of the support framework 2 is not an important aspect of the present invention since it is envisaged that the box structure 1 may be mounted on any suitable surface, for example a large table, bench or the like.

FIG. 4 shows a cross-sectional view through the box structure 1 from which it can be seen that each half thereof essentially comprises a pair of rails 5 positioned above a heating means 6 such as a row of gas burners, and a worm conveyor 8 for conveying onions 7 along the rails 5.

The rails 5 span substantially the length of the box structure 1 and are spaced a distance above the floor thereof. The rails 5 may be attached to the ends of the box structure 1 and/or may be suppoted by struts (not shown in the drawings) depending from the floor or sides thereof.

Preferably curved guards 10 are provided which run substantially the length of the rails 5 and which are positioned in close proximity to the tips of the teeth of the worm conveyor 8 so that onions 7 which may become upset from the rails 5 will tend to roll back onto the rails 5. The curved guards 10 may be integrally formed with the interior of the box structure 1 or may be mounted by suitable struts (not shown in the drawings) depending from the floor or walls thereof.

Heating means in the preferred embodiment comprises gas burners 6 but may comprise electric heating elements, or any suitable heating means known in the art optionally assisted by heat reflecters, air fans or the like suitably positioned to direct heat towards the rail 5. The gas burners 6 of the preferred embodiment are positioned directly below the rails 5 so that the flame from the gas burners 6 will substantially envelop onions 7 being conveyed along the rails 5.

The gas burners 6 are best illustrated in FIG. 3 which shows a plan view of the box structure 1 with the worm conveyors 8 removed. From this figure it can be seen that the gas burners 6 span substantially the length of the box structure 1, as do the rails 5. The gas burners 6 may be provided with adjusting nozzles to vary the flame size if desired. Gas is supplied to the gas burners by way of inlet pipes 11 (see FIG. 2) which are preferably fitted with flow adjusting taps (not shown in the drawings) as is known in the art.

The gas burners 6 may be mounted, for example, on cross-members 15 which span across the interior of the box structure 1 at regular intervals along its length or by way of struts (not shown in the drawings) depending from the floor or sides of the box structure 1.

The worm conveyors 8 mounted in each half of the box structure 1 convey onions 7 along each pair of rails 5. The central shaft 8a of each worm conveyor 8 is journalled bearings 9 mounted in the ends of the box structure 1 such that the tips of the teeth of the worm conveyors 8 are in close proximity to the rails 5 as is best shown in FIG. 4.

The pitch of the teeth of the worm conveyors 8 and the speed of rotation thereof are chosen such that the time taken for an onion to traverse the length of the rails 5 is sufficient to ensure adequate scorching of the outer skin of the onion so that this skin may be readily removed by some further processing stage.

A motive force for rotation of the worm conveyor is provided, and a suitable arrangement is illustrated in FIGS. 1 and 2. An electric motor 17 of suitable capacity is coupled for example by way of drive belts and pulleys 19 to one end of each worm conveyor 8 which extends through an end wall of the box structure 1.

Means for loading onions on to the rails 5 is preferably provided and a suitable arrangement is generally indicated at 3 in FIGS. 1 and 2. A subsidiary support framework 20 supports a container 21 into which unpeeled onions 7 are placed.

A wheel 22 journalled for rotation in an end wall of the container 21 about an axis substantially normal to the axis of rotation of the worm conveyors 8 is provided with scoop shaped cutout sections 23 on either side of its outer periphery. The scoop cutouts 23 are of a size such that they will collect only one onion each as the wheel 22 rotates and the periphery thereof passes through onions 7 in the container 21, and will deposit these onions onto the top of the chute 25. If a scoop cutout 23 should collect two onions at one time then the extra onion will tend to roll out of one of the side chutes 25c.

Onions deposited at the top of the chute 25 will roll down this chute to fall onto the rails 5 at one end of the box structure 1. T-shaped forks 26 preferably extend from the circumference of the wheel 22 and appropriately shaped slots 27 are formed in the base of the container 21 and the chute 25 so that when the wheel 22 rotates these forks 26 will pass through onions 7 contained in the container 21 to prevent clustering of the same.

A suitable drive arrangement for the wheel 22 may be provided for example by way of a pulley and belt arrangement 28 which provides drive to the wheel 22 from an end of the central shaft of a worm conveyor 8 through a right angle gear box 29.

Means for exit of scorched onions from the rails 5 may be provided by, for example, chutes 30 onto which onions drop from the end of the rails 5 through holes 31 formed in the floor of the box structure 1.

Suitable containers may be placed at the bottom of the chutes 30 to catch onions or alternatively the onions may be fed directly to some further processing stage.

It is envisaged that many modifications may be made to the preferred embodiment machine. For example, the onion loading apparatus, and worm drive means may be replaced with any suitable arrangement known in the art.

I claim:

1. Apparatus for peeling an onion (as herein defined) by scorching the skin thereof, said apparatus including a bed to support the onion during said scorching, said bed comprising a plurality of spaced apart, substantially parallel rails;
   a worm conveyor having a longitudinal axis and a helical periphery, means for rotatably mounting said worm conveyor with said longitudinal axis extending substantially parallel to said rails and with said periphery positioned relative to said rails whereby rotation of said worm conveyor will cause an onion supported by said rails to be conveyed along said rails; and
   heating means for directing heat towards the onion being conveyed along said rails, said heating means being adjustable to provide heat of sufficient intensity for scorching the skin of the onion while being conveyed substantially the length of said rails.

2. Apparatus as claimed an claim 1, wherein said bed comprises two spaced apart rails interposed between said heating means and said periphery of the worm conveyor.

3. Apparatus as claimed in claim 2, wherein said heating means comprises a plurality of gas jets disposed in a substantially regular pattern to enable combustion gases from said jets to pass around the rails to scorch the skin of an onion supported on said rails.

4. Apparatus as claimed in claims 1, 2 or 3 wherein the said bed is a generally rectangular structure having a pair of longitudinal edges symmetrically disposed beneath said worm conveyor and wherein a guard extends upwardly from adjacent each longitudinal edge of the bed towards the periphery of the said worm conveyor, each said guard extending substantially the length of said bed.

5. Apparatus as claimed in claim 4 further comprising an onion supply container, means for loading onions from said supply container to said bed, said loading means comprising a wheel having an outer periphery, scoops provided on said outer periphery, and means for rotatably supporting said wheel whereby said scoops are adapted to pass through said supply container and collect onions therefrom for loading onto said bed.

6. Apparatus as claimed on claim 5 further including chute means disposed between the periphery of said wheel and said bed for directing onions collected by said scoops onto said rails.

7. Apparatus as claimed in claim 6 wherein drive means is provided for rotating said worm conveyor.

8. Apparatus as claimed in claim 7 wherein said drive means is coupled through said worm conveyor to said wheel.

9. Apparatus for the flame peeling of onions wherein the improvement comprises:
   a box structure having an entrance end and an exit end;
   a pair of parallel, spaced apart rails mounted within and attached to said box structure, said rails being adapted to support onions between said entrance and exit ends;
   means for conveying onions along said rails comprising a worm conveyor having a longitudinal central shaft and a periphery formed by helical teeth, bearing means mounted in the ends of said box structure for supporting said central shaft substantially parallel to and above said rails and with said helical teeth in close proximity to said rails;
   curved guard means extending substantially the length of said rails and positioned in close proximity to said periphery for causing onions upset from said rails to roll back thereon;
   and heating means comprising gas burners positioned directly below said rails whereby flame from said gas burners will substantially envelop onions being conveyed along said rails.

10. Apparatus according to claim 9 further comprising means for loading onions onto said rails at the entrance end of said box structure, said loading means including a container for unpeeled onions, said container having an end wall facing said entrance end, a wheel having an outer periphery provided with scoops each adapted to contain one onion, means for mounting said wheel on said container end wall for rotation about an axis substantially normal to said worm conveyor central shaft whereby said scoops are adapted to pass through and collect onions in said container, and chute means for delivering collected onions from said wheel to said rails.

* * * * *